United States Patent Office

3,378,402
Patented Apr. 16, 1968

3,378,402
PROCESS OF PRODUCING A COPOLYESTER-
COATED OBJECT
Maria V. Wiener, Akron, Ohio, assignor to The Goodyear Tire & Rubber Company, Akron, Ohio, a corporation of Ohio
No Drawing. Filed Mar. 13, 1964, Ser. No. 351,851
1 Claim. (Cl. 117—232)

ABSTRACT OF THE DISCLOSURE

A copolyester is formed from 60 to 100 mol percent of terephthalic acid, 40 to 0 mol percent isophthalic acid; and alcohols which contain 15 to 40 mol percent of polyols which contain 3 to 6 hydroxy groups, the remainder of the alcohols being diols of which at least 50 mol percent is 1,4-cyclohexanemethanol and the balance is diols containing 1 to 6 carbon atoms. The copolyester makes good electrical insulation and other coatings.

---

This invention relates to the method of coating objects with a polyester.

The polyester is derived from an aromatic dicarboxylic acid. The dicarboxylic acid portion of the polyester is composed of 60 to 100 mol percent of terephthalic acid and 40 to 0 mol percent of isophthalic acid.

Fifteen to 50 mol percent of the alcohol portion of the copolyester is derived from an alcohol which contains at least three hydroxyl groups (referred to herein as "polyols"), the balance being derived from diols, at least 50 mol percent of which diols are 1,4-cyclohexanedimethanol. The polyols used in carrying out the invention, preferably contain only three hydroxyl groups, and usually contain no more than five or six hydroxyl groups.

Precopio et al. 2,936,296 describes a cross-linked polyester insulation in which ethylene glycol is used. We quote from that patent:

"When acids or derivatives of acids other than terephthalic acid or isophthalic acid are employed, or when glycols other than ethylene glycol are employed in the resins of the present invention, the resulting product is deficient in at least one of the several properties required for a high temperature insulating material." (Column 8, lines 31–36.)

The Precopio et al. patent is particularly concerned with insulation for magnet wires. It recognizes that a good cut-through temperature is necessary if the wire is to be subjected to high temperatures. (Column 6, line 33 to column 7, line 4.)

It has been found that when the glycol units of Precopio et al. are wholly, or at least partially, replaced by trans- and/or cis- (100/0% to 0/100%) 1,4-cyclohexanedimethanol, compositions result which are more resistant to high temperatures and have improved electrical insulating properties. Electrical conductors coated with these new polyesters, after curing withstand all of the required tests and moreover they have a higher service temperature (higher sticking temperature and higher cut-through temperature) than the coatings of the prior art. Also, the thermal stability, hydrolytic stability and solvent resistance of the new polyesters are significantly improved.

Kibler et al. 2,901,466 describes thermoplastic polyesters made with 1,4-cyclohexanedimethanol. The patent refers more particularly to spun fibers, and dyed fibers and fabrics (column 2, lines 10–18; column 14, lines 22–26), and films (Examples 55 and column 14, lines 24–29). It makes no reference to cross-linked polyester structures.

The acid of the polyester of this invention may be solely terephthalic acid or it may be derived from a mixture of terephthalic acid and a minor portion of isophthalic acid in the ratio of 90:10, 80:20; 70:30 or 60:40 mol percent, for instance. A lower alkyl ester of the acids may be used instead of the acids for the preparation of the polyester, such as dimethyl or diethyl terephthalate and isophthalate.

The mol percentage content of acid and alcohol portions within the polyester will depend upon the acids and alcohols employed. Of the total alcohol portion, 15 to 50 mol percent is derived from a polyol. Thus, the ratio of polyol to glycol may, for example, be 15:85, 25:75, 40:60 or 50:50 mol percent. The polyol generally employed is glycerol, but other polyols which contain 3 to 6 hydroxyl groups may be used and includes, for example, mannitol, diglycerol, sorbitol, 1,1,1-trimethylol ethane, 1,1,1-trimethylol propane, pentaerythritol, etc.

The glycol from which the glycol portion of the polyester is derived is at least 50 mol percent cis- and/or trans-1,4-cyclohexanedimethanol. The trans-glycol is preferred, but the mixture is commercially available and less expensive than a pure isomer, and will generally be used. Thus the diol content will be composed of cis- and/or trans-1,4-cyclohexanedimethanol in the ratio to one or more other glycols of 50:50, 60:40; 70:30, 80:20, 90:10, or 100:0 mol percent, for example. Of the other glycols which may be used, ethylene glycol, $CH_2OH.CH_2OH$, is preferred. Other glycols include those containing up to six carbon atoms, such as the 1,2-propylene glycol, trimethylene glycol, tetramethylene glycol, pentamethylene glycol and hexamethylene glycol.

The polyesters are usually made by employing an esterification or alcoholysis and polymerization catalyst, including for example hydrochloric acid, toluene sulfonic acid, and compounds of lead, zinc, cadmium, magnesium, manganese, germanium, titanium, iron, tin, cobalt, lanthanum, cerium, uranium, antimony, etc., which are soluble in the reaction mixture.

Prior to application of the polyester to the conductor, the polymerization of the polyester is stopped before gelation occurs, and is controlled to terminate as nearly as possible before gelation starts. The polyester is then shaped, as by coating it on a conductor, as, for instance, by dipping a wire into a solution of the polyester which contains 15 to 40 percent of polyester solids. Several dips with evarporation of solvent and curing of the coating between the dips are generally desirable, depending upon the thickness of insulation required. Alternatively, the insulation may be applied by brushing or spraying. For a variety of uses, the polyester may be molded in the absence of solvent or it may be applied as a coating to metal or glass or other solid from a powder by the "fluidized bed," "flame spray," "electrostatic spray," etc., processes.

The polyester is cured, usually by heating, and a cross-linking catalyst is usually included in the polyester or in the polyester solution to hasten the cross-linking reaction. Such catalysts include, for example, compounds of zinc, manganese, cobalt, lead, cadmium, calcium, titanium and other metals used often in the form of octoates, naphthenates, linoleates, etc. and aliphatic and aromatic isocyanates, etc.

The conditions for esterification or for the alcoholysis as well as for the polymerization are well known in the art. The polymerization is terminated before substantial cross linking sets in. The intrinsic viscosity of the polyester as measured in a 60:40 mixture of phenol and sym.-tetrachloroethane will then bei n the range of 0.2 to 0.5, the upper limit depending upon the amount and type of units with tri- and higher-functionality.

For solution-coating applications, the polyester is preferably dissolved in an inert solvent as, for example, cresylic acid, a mixture of cresols with aromatic petroleum solvents, etc., and the cross-linking catalyst is added to the solution. Usually the catalyst content is not in excess of five percent of the weight of the polyester, but larger amounts may be used. The amount of isocyanate may be much larger. This solution, generally containing 15 to 40 percent of curable polyester is suitable for application to conductors by dipping, for example. Each dip is followed by relatively short heating to about 400° C. or other temperature required for removal of solvent and rapid cross linking. In the commercial production of insulated wire, etc., the curing process is usually hastened by heating to an appropriate temperature. Several applications of the coating with evaporation of the solvent after each, give a more uniform covering of insulation than a single application.

The following examples are illustrative:

EXAMPLE I

A mixture of 19.4 grams of dimethylterephthalate (0.1 mol), 3 grams of glycerine (0.033 mol equal to about 29 mol percent of the total alcohol content) and 11.6 grams (0.08 mol equal to about 71 mol percent of the total alcohol added) of a commercial mixture of cis- and trans - 1,4-cyclohexanedimethanol (containing about 30 percent cis- to 70 percent trans-) together with 0.006 gram of zinc acetate and 0.0005 gram of polymeric ethylene glycol titanate (both catalysts) were placed in a standard glass-tube polymerization reactor equipped with a stirrer. A stream of nitrogen was slowly passed over the reaction mixture. At a bath temperature of 217 to 245° C. the methanol formed by the alcoholysis was volatilized, and after 3½ hours the alcoholysis was substantially complete. Within the next ½ hour the pressure in the reactor was gradually reduced from atmospheric to 1.5 mm. Hg at 245 to 280° C. bath temperature. The polymerization was continued for another ½ hour at 280° C. and 1.5 mm. Hg pressure with evolution of glycol until a copolyester of 0.257 intrinsic viscosity had formed. Atmospheric pressure was then reestablished with nitrogen and the product was thereafter removed from the reactor.

Five grams of the copolyester were dissolved in 23.4 grams of cresylic acid resulting in a 17.6 percent solids concentration. Zinc naphthenate (cross-linking catalyst) was added to this solution to yield 0.5 percent zinc (based on the weight of the copolyester). A steel conductor was dipped in this solution and cured at 425° C. for one minute. The dipping and curing were repeated four times and an insulation coating 0.0025 inch thick was formed.

The insulation was found to be very satisfactory when tested for each of the properties mentioned in Precopio 2,936,296 as required in insulation. The insulation had a higher cut-through temperature than conventional insulation of substantially the same thickness prepared by the process disclosed in the Precopio et al. patent. It was tested by a slight modification of the test described in the Precopio et al. patent. The cut-through temperature of the test material was 215° C. compared to 171° C. for the conventional insulation, applied and tested by the identical method.

EXAMPLE II

The dimethylterephthalate (0.01 mol) used in Example I was replaced by 1.94 grams (0.01 mol) of dimethylisophthalate. The procedure was the same as described in Example I. The polyester obtained, which had an intrinsic viscosity of 0.364 was treated, applied and cured in the previously described manner. The cut-through temperature of this sample, tested as before, was 200° C.

The insulated conductors prepared as in Examples I and II and a conductor identically treated with conventional insulation, as described, were soaked in acetone at 27° C. for 15 minutes. The test insulation of Examples I and II was not affected whereas the conventional insulation softened and chipped when subjected to a thumb-nail test.

The invention is covered in the claim which follows. What I claim is:

1. The process of producing a coated object which consists of producing a polyester from (1) 60 to 100 mol percent of a compound selected from the class consisting of terephthalic acid and lower alkyl esters thereof, and 40 to 0 mol percent of a compound selected from the class consisting of isophthalic acid and lower alkyl esters thereof and (2) an alcohol mixture comprising 15 to 40 mol percent of glycerine and 85 to 60 mol percent of a diol of which diol at least 50 mol percent is selected from the class consisting of cis- and trans-1,4-cyclohexanedimethanols, the balance of the diol containing 1 to 6 carbon atoms, and stopping the reaction before substantial gelation occurs, the pre-gel polyester being soluble in cresylic acid, covering the object with this polyester with a cross-linking catalyst incorporated therein, and then heating at substantially 425° C. and substantially one minute to cure the polyester.

References Cited

UNITED STATES PATENTS

| | | | |
|---|---|---|---|
| 2,936,296 | 5/1960 | Precopio et al. | 260—75 |
| 2,901,466 | 8/1959 | Kibler et al. | 260—75 |

WILLIAM H. SHORT, *Primary Examiner.*

R. T. LYON, *Assistant Examiner.*